US012350956B2

(12) United States Patent
Edel et al.

(10) Patent No.: US 12,350,956 B2
(45) Date of Patent: Jul. 8, 2025

(54) HYBRID INSERTER/WRAPPER SYSTEM

(71) Applicant: DMT Solutions Global Corporation, Danbury, CT (US)

(72) Inventors: Eddy Edel, New Milford, CT (US); John Robert Masotta, Newtown, CT (US); Anthony E. Yap, Palmyra, PA (US)

(73) Assignee: DMT Solutions Global Corporation, Danbury, CT (US)

( * ) Notice: Subject to any disclaimer, the term of this patent is extended or adjusted under 35 U.S.C. 154(b) by 112 days.

(21) Appl. No.: 18/370,585

(22) Filed: Sep. 20, 2023

(65) Prior Publication Data

US 2024/0092118 A1 Mar. 21, 2024

Related U.S. Application Data

(60) Provisional application No. 63/408,407, filed on Sep. 20, 2022.

(51) Int. Cl.
*B31B 70/00* (2017.01)
*B31B 70/10* (2017.01)
*B31B 70/14* (2017.01)
*B31B 70/16* (2017.01)
*B31B 70/26* (2017.01)
(Continued)

(52) U.S. Cl.
CPC ............... *B43M 3/04* (2013.01); *B31B 70/10* (2017.08); *B31B 70/146* (2017.08); *B31B 70/16* (2017.08); *B31B 70/26* (2017.08); *B31B 70/62* (2017.08); *B31B 2155/001* (2017.08)

(58) Field of Classification Search
CPC ............ B31B 2160/10; B31B 2150/00; B31B 2170/20; B31B 70/261; B31B 70/88; B31B 2160/106; B31B 70/00; B31B 2150/001
USPC ...... 53/284.3, 460, 429, 411, 540, 569, 117, 53/206, 435, 55, 447, 461, 500
See application file for complete search history.

(56) References Cited

U.S. PATENT DOCUMENTS

| | | | | |
|---|---|---|---|---|
| 3,641,733 A * | 2/1972 | Lerner | B43M 5/045 | |
| | | | 53/562 | |
| 4,443,211 A * | 4/1984 | Wooley | B31B 70/8122 | |
| | | | 493/224 | |

(Continued)

OTHER PUBLICATIONS

International Search Report and Written Opinion mailed Dec. 12, 2023, for Application No. PCT/US2023/033231 (12 pages).

*Primary Examiner* — Jacob A Smith
(74) *Attorney, Agent, or Firm* — Brown Rudnick LLP; Matthew P. York

(57) ABSTRACT

The invention is a hybrid inserter/wrapper system comprising a hybrid inserter/wrapper system comprising a modular document inserter system and a unique wrapper-like envelope creation module operably connected thereto. The wrapper-like envelope creation module is configured to operate in a first mode and a second mode. In the first mode, the wrapper-like envelope creation module is configured to fabricate wrapper-like outer envelopes and feed such outer envelopes to the inserter system. In the second mode, the wrapper-like envelope creation module is configured to allow the inserter to be loaded with premade envelopes and feed such envelopes to the inserter system. In either mode, the document inserter system further carries out downstream operations to thereby produce a finished mailpiece.

20 Claims, 5 Drawing Sheets

(51) Int. Cl.
*B31B 70/62* (2017.01)
*B43M 3/04* (2006.01)
*B31B 155/00* (2017.01)

(56) References Cited

U.S. PATENT DOCUMENTS

| | | | | | |
|---|---|---|---|---|---|
| 5,155,973 | A * | 10/1992 | Hipko | B43M 5/04 | 53/450 |
| 6,155,031 | A * | 12/2000 | Ballestrazzi | B65H 39/043 | 53/381.5 |
| 6,250,625 | B1 * | 6/2001 | Janatka | B43M 3/04 | 271/9.12 |
| 6,846,278 | B1 * | 1/2005 | Hill | B65H 45/14 | 493/437 |

* cited by examiner

HYBRID INSERTER/WRAPPER SYSTEM

CROSS-REFERENCE TO RELATED APPLICATIONS

This application claims priority to, and the benefit of, U.S. Provisional Application No. 63/408,407, filed Sep. 20, 2022, the content of which is incorporated by reference herein in its entirety.

TECHNICAL FIELD

The present disclosure relates generally to mailpiece fabrication systems, and, more particularly, to a hybrid inserter/wrapper system comprising a unique wrapper-like envelope creation module configured to provide dual functions with respect to envelope creation and/or envelope feeding to a modular document inserter system.

BACKGROUND

Direct mail is an important tool for businesses to communicate with customers. In various mass mailing preparations, a mail package may include one or more documents, which may be folded and/or combined with cards or other inserts, all of which must be inserted into an envelope, which is sealed, addressed, and stamped for mailing. As such, many businesses turn to mailpiece fabrication systems, such as mailpiece inserters and mailpiece wrappers, to periodically produce a large volume of mail.

Mailpiece fabrication systems are analogous to automated assembly equipment in that sheets, inserts and envelopes are conveyed along a feed path and assembled in, or at, various modules of the mailpiece fabrication system. For example, the typical inserter system resembles a manufacturing assembly line. Sheets and other raw materials (e.g., other sheets, enclosures, and envelopes) enter the inserter system as inputs. Then, a plurality of different modules or workstations in the inserter system cooperatively operate to process the sheets until a finished mailpiece is produced. The exact configuration of each inserter system depends upon the needs of each particular customer or installation.

Some mailpiece fabrication systems employ a wrapping system to encapsulate the mailpiece content in an outer wrapping material or substrate. For example, in lieu of inserting and/or sealing the content material into a traditional "envelope", content material is fed into an outer substrate provided by a wrapping module. More specifically, the content material is typically fed into the wrapping module, which receives a supply of substrate material from a web of rolled material. Prior to being fed to the wrapping module, an adhesive application module may be used to deposit an adhesive in a predefined two-dimensional pattern on the outer substrate material. As the substrate material is folded by the wrapping module, an envelope pocket is produced for receipt of the content material, thereby enclosing and sealing the content material within the tubular-shaped envelope wrap, generally resembling a "sausage-type" wrap.

While the use of current outer wrapping technology may offer a lower overall cost per production, reduced inventory carrying costs, and reduced supply chain complexities, there are limitations. Most notably, such outer wrapping technology has a drawback of being lower quality. In fact, many companies using such outer wrap technology choose to utilize the lesser quality wrap as a result of having particular mailing applications that will be satisfied with a lesser envelope quality, and large mail volume with similar format. However, the low quality of current outer wrapping technology has resulted in a low global adoption, and a low percentage of the overall global mail volume.

SUMMARY

The present invention relates to a hybrid inserter/wrapper system comprising a unique wrapper-like envelope creation module operably connected to a modular document inserter system. The wrapper-like envelope creation module is configured to provide dual functions with respect to envelope creation and/or envelope feeding. In particular, the wrapper-like envelope creation module is configured to operate in a first mode, in which the wrapper-like envelope creation module is configured to fabricate wrapper-like outer envelopes and feed such outer envelopes to the inserter system. When operating in a second mode, the existing envelope feeder module on the inserter is configured to be loaded with premade envelopes and feed such envelopes to the inserter system. In either mode, the document inserter system further carries out downstream operations to thereby produce a finished mailpiece.

The wrapper-like envelope creation module may generally include a loading member configured to retain and feed a substrate to a cutting assembly. The substrate may generally include a paper or paper-like product to be subsequently formed into a wrapper-like outer envelope. The paper may either be in the form of individual sheets of paper or, in some embodiments, the loading member may be configured to hold a web of paper. Accordingly, the loading member may further include an unwinder for retaining, supporting, and subsequently feeding the web of paper to the cutting assembly. The cutting assembly may include various cutting members, including, but not limited to, cutting rollers and/or blocks, trimmers (i.e., edge trimmers or the like), and scoring wheels, for cutting the web of paper and/or individual sheets to size and further prefolding portions of a given portion of substrate for subsequent formation of the outer envelope. The particular configuration of cutting and/or folding members may be based on a given client's desired production needs and thus such configurations can be customized based on the final desired envelope product.

The wrapper-like envelope creation module may further include a registration table, in which cut, scored, and prefolded pieces of substrate are subsequently aligned with and fed through one or more adhesive applicators configured to apply adhesive in a predefined two-dimensional pattern on the piece of substrate. For example, the adhesive applicators may generally be configured to apply adhesive to side seams of the piece of substrate (e.g., associated with the folding patterns created on the piece of substrate). The piece of substrate is then fed into a folder member configured to fold prefolded portions of the substrate upon the predefined pattern of adhesive previously applied to the substrate to thereby create a bond between layers of the substrate and produce an outer envelope. The outer envelope then passes along a pre-feeder assembly and is subsequently transferred to an envelope feeder module of the modular document inserter system, at which point the inserter system carries out downstream operations to thereby produce a finished mailpiece (i.e., content material is inserted into the produced outer envelope and subsequently sealed).

The wrapper-like envelope creation module is configured to provide the inserting system with dual functions with respect to envelope creation and/or standard envelope feeding. Integration of the unique wrapper-like envelope creation module will allow a customer to go from wrapper-like outer envelope fabrication, in which the outer envelope is produced in the workcell, to a traditional outer envelope using an envelope that was supplied from another workcell, or purchased from a third party. In particular, the wrapper-like envelope creation module is able to handle a cutsheet or roll-fed web for fabrication of the outer envelope, or can be reconfigured to accept a traditional envelope (flap pre-glued and flap pre-folded) to wrapper-like envelopes, with the envelope already fabricated, with side seams closed but flap open, in the pre-feeder assembly, and where the flap will be closed inside the inserter system workcell.

Accordingly, hybrid inserter/wrapper system of the present invention provides numerous advantages over conventional mailpiece fabrication and inserter systems. The hybrid inserter/wrapper system combines the integrity and efficiency of high speed inserting with an alternative envelope creation process, thereby helping mail operations streamline the production of high quality customer communications and helping mailers achieve significant cost savings and operational improvements, with little to no application or workflow changes.

In particular, the present invention will allow mailers to lower their total cost per production, where applicable, or, if desired, revert back to the traditional workflow and cost model. Furthermore, the capacity of a hopper associated with the envelope feeder module of the inserter system is greatly increased. In particular, the pre-feeder assembly greatly increases the total amount of envelopes that can be stacked and buffered to subsequently feed from the wrapper-like envelope creation module into the envelope feeder module of the insert system. For example, the overall hopper on the inserter capacity will go from several hundred envelopes to several thousands, thereby greatly reducing the labor required to operate the system and thus reducing overall operating costs. In particular, at roughly 10,000 cycles/hour, an envelope feeder of a conventional inserter system may require reloading of envelopes every couple of minutes, whereas the present invention may only require reloading of envelopes once or twice per shift. Another operational benefit of utilizing the unique capabilities of the present invention is that rolls of paper are much denser than pallets of envelopes, such that fabricating outer envelopes via webs of paper would result in less floor space for material storage. Yet still, the present invention results in realization of a capital costs that is about half of the traditional sausage wrapper fabrication techniques. Furthermore, this solution will allow the customer to transition from traditional enveloping to a wrapper-like solution and workflow and adapt their business to the current global supply change climate.

BRIEF DESCRIPTION OF THE DRAWINGS

Features and advantages of the claimed subject matter will be apparent from the following detailed description of embodiments consistent therewith, which description should be considered with reference to the accompanying drawings.

FIG. 1 is a block diagram schematic of a document inserter system in which the wrapper-like envelope creation module of the present invention is operably coupled to.

FIGS. 3, 4, and 5 illustrate the wrapper-like envelope creation module operably connected to the document inserter system by way of a pre-feeder assembly that is coupled to an envelope feeder module of the inserter system and configured to provide fabricated and/or premade envelopes thereto.

Figure 1:
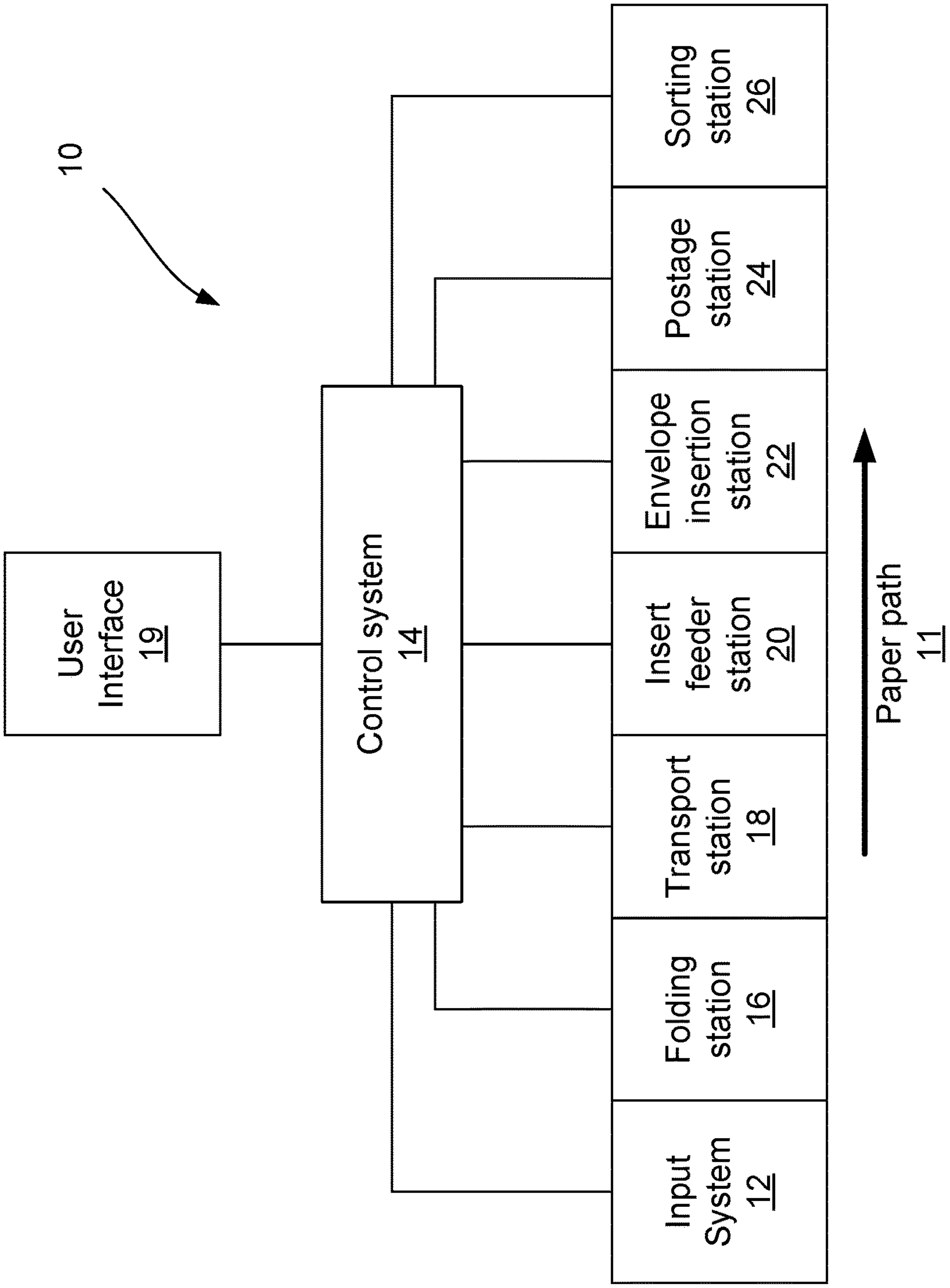

For a thorough understanding of the present disclosure, reference should be made to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient.

DETAILED DESCRIPTION

By way of overview, the present invention is directed to a hybrid inserter/wrapper system that combines the integrity and efficiency of high speed inserting with an alternative envelope creation processing. In particular, the hybrid inserter/wrapper system comprises a unique wrapper-like envelope creation module operably connected to a modular document inserter system. The wrapper-like envelope creation module allows the inserter to provide dual functions with respect to envelope creation and/or envelope feeding. In particular, the inserter is configured to operate in a first mode, in which the wrapper-like envelope creation module is configured to fabricate wrapper-like outer envelopes and feed such outer envelopes to the inserter system, and operate in a second mode, in which the inserter is configured to be loaded with premade envelopes and feed such envelopes to the inserter system. In either mode, the document inserter system further carries out downstream operations to thereby produce a finished mailpiece.

Accordingly, hybrid inserter/wrapper system of the present invention provides numerous advantages over conventional mailpiece fabrication and inserter systems. By providing dual functionality with respect to envelope creation and/or feeding, the unique wrapper-like envelope creation module will allow a customer to go from wrapper-like outer envelope fabrication, in which the outer envelope is produced in the workcell, to a traditional outer envelope using an envelope that was supplied from another workcell or purchased from a third party. In particular, the wrapper-like envelope creation module is able to handle a cutsheet or roll-fed web for fabrication of the outer envelope, or can be reconfigured to accept a traditional envelope (flap pre-glued and flap pre-folded) to wrapper-like envelopes, with the envelope already fabricated, with side seams closed but flap open, in the pre-feeder assembly, and where the flap will be closed inside the inserter system workcell. The hybrid inserter/wrapper system combines the integrity and efficiency of high speed inserting with an alternative envelope creation process, thereby helping mail operations streamline the production of high quality customer communications and helping mailers achieve significant cost savings and operational improvements, with little to no application or workflow changes.

As described in greater detail herein, the unique wrapper-like envelope creation module can be incorporated into a production mail inserter, allowing the functions of the envelope fabrication and/or feeding and the document insertion to be combined. For example, the wrapper-like envelope creation module can be incorporated into, or otherwise operably associated with, modular inserter platforms, including, but not limited to, any one of the EVOLUTION™, MAILSTREAM EVOLUTION™, RIVAL™, and EPIC™ inserter platforms available from DMT Solutions Global Corporation dba BlueCrest (Danbury, CT).

FIG. 1 is a block diagram schematic of an exemplary document inserter system 10 in which the wrapper-like envelope creation module of the present invention can be operably coupled thereto. The document inserting system 10 includes several stations or modules. The document insertion system 10 is illustrative and many other configurations may be utilized.

The system 10 includes an input system 12 that feeds paper sheets from a paper web to an accumulating station that accumulates the sheets of paper in collation packets. In some embodiments, only a single sheet of a collation is coded (the control document), which coded information can be one input into the control system 14. The control system includes a processor configured to execute instructions that control the processing of documents in the various stations of the mass mailing inserter system 10. The system 10 may include a user interface 19 for controlling one or more user inputs and displaying one or more outputs from the system 10, allowing a user to interact with and control the operation of the system, can be physically connected to the system or can be located remotely. The user interface 19 can include a screen such as a touchscreen configured to display operating conditions and parameters of the inserter system 10 to a user. The user interface 19 can include other input devices such as a keyboard/keypad or a mouse.

The input system 12 is configured to feed sheets in a paper path, as indicated by arrow 11, along what is known as the main deck of inserter system 10. After sheets are accumulated into collations by input system 12, the collations are folded in folding station 16 and the folded collations are then conveyed to a transport station 18, preferably operative to perform buffering operations for maintaining a proper timing scheme for the processing of documents in insertion system 10.

Each sheet collation is fed from the transport station 18 to an insert feeder station 20. It should be noted that an inserter system 10 may include a plurality of feeder stations, but for clarity, only a single insert feeder 20 is shown. The insert feeder station 20 is configured to convey an insert (e.g., an advertisement or the like) from a supply tray to the main deck of inserter system 10 so as to be combined with the sheet collation conveying along the main deck. The sheet collation along with nested insert(s) are next conveyed into envelope insertion station 22 that is operative to open an unsealed envelope and insert the collation into the opening of the envelope.

As will be described in greater detail herein, the wrapper-like envelope creation module of the present invention provides envelopes to the inserter system 10, specifically feeding envelopes to the envelope insertion station 22.

The filled envelope may then be conveyed to a station for sealing and/or rearranging the filled envelope for subsequent processing. For example, in some embodiments, the system 10 may include a sealing and flipping station that is operable to wet the adhesive substance on the flap of the envelope, rotate the envelope into a face-up orientation, and seal the envelope by pressing the flap against the body of the envelope. The filled and sealed envelope is then conveyed to postage station 24. Finally, the envelope is conveyed to sorting station 26 that sorts the envelopes.

It should be noted that the inserter system 10 may include additional stations/modules for performing additional tasks. For example, mailpiece inserter systems may include a variety of apparatus/modules for conveying and processing a substrate/sheet material along the feed path, in addition to those stations/modules described herein. For example, inserter systems consistent with the present disclosure may further include apparatus/modules for: (i) accumulating printed content to form a multi-sheet collation in an "accumulator"; (ii) folding the content to produce a variety of fold configurations such as a C-fold, Z-fold, bi-fold and gate fold, in a "folder"; (iii) feeding mailpiece inserts such as coupons, brochures, and pamphlets, in combination with the content, in a "chassis module"; and (iv) printing recipient/return addresses and/or postage indicia on the face of the mailpiece envelope at a "print station".

Figure 2:
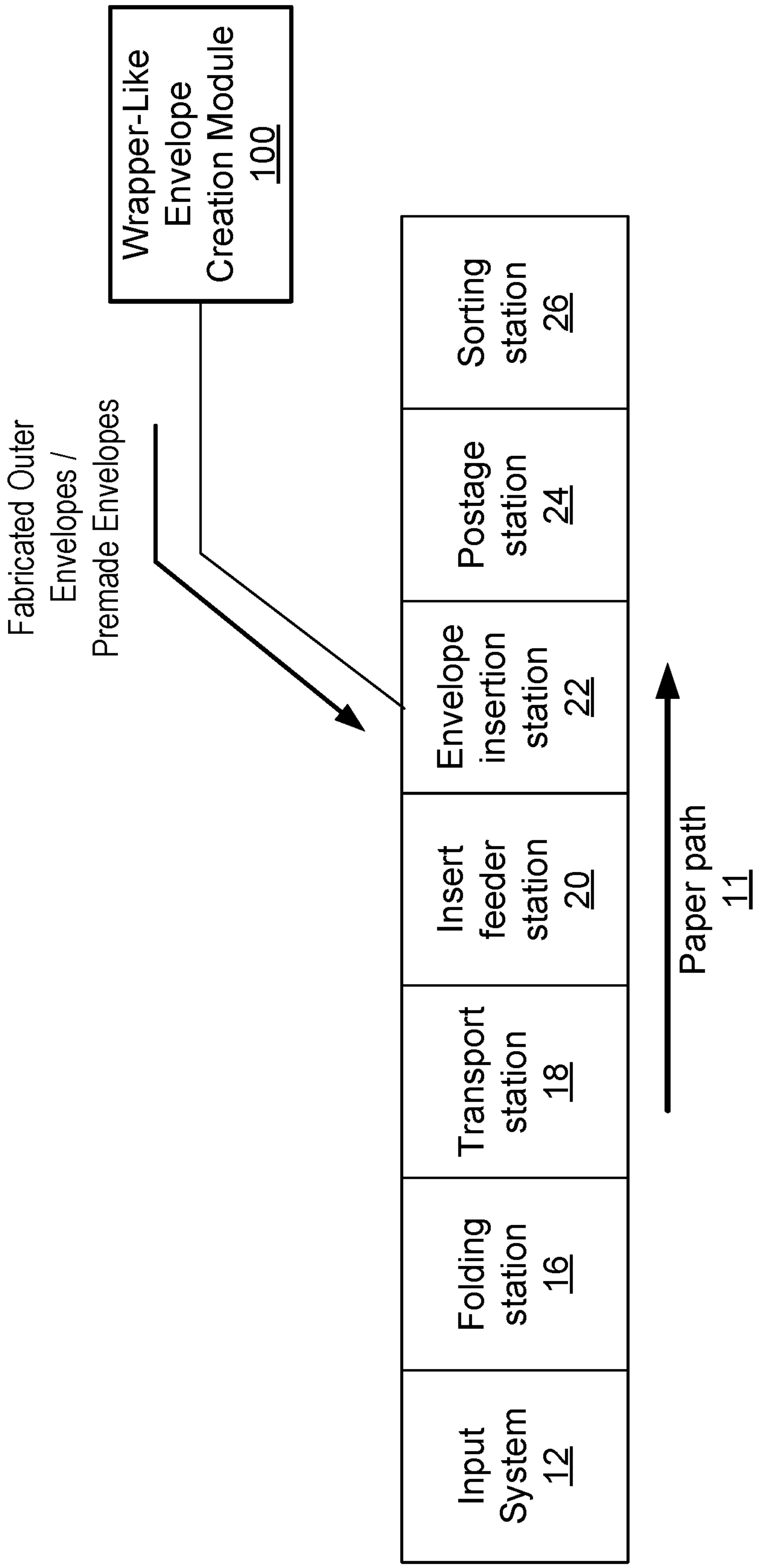
FIG. 2 is a block diagram schematic of the hybrid inserter/wrapper system of the present invention showing a wrapper-like envelope creation module operably associated with the document inserter system, in which the wrapper-like envelope creation module is configured to provide dual functions with respect to envelope creation and/or envelope feeding to the inserter system which further carries out downstream operations to thereby produce a finished mailpiece.

FIG. 2 is a block diagram schematic of the hybrid inserter/wrapper system of the present invention showing a wrapper-like envelope creation module 100 operably associated with the document inserter system 10, in which the wrapper-like envelope creation module 100 allows the inserter to be configured to provide dual functions with respect to envelope creation and/or envelope feeding. The inserter system further carries out downstream operations to thereby produce a finished mailpiece.

Figure 3:
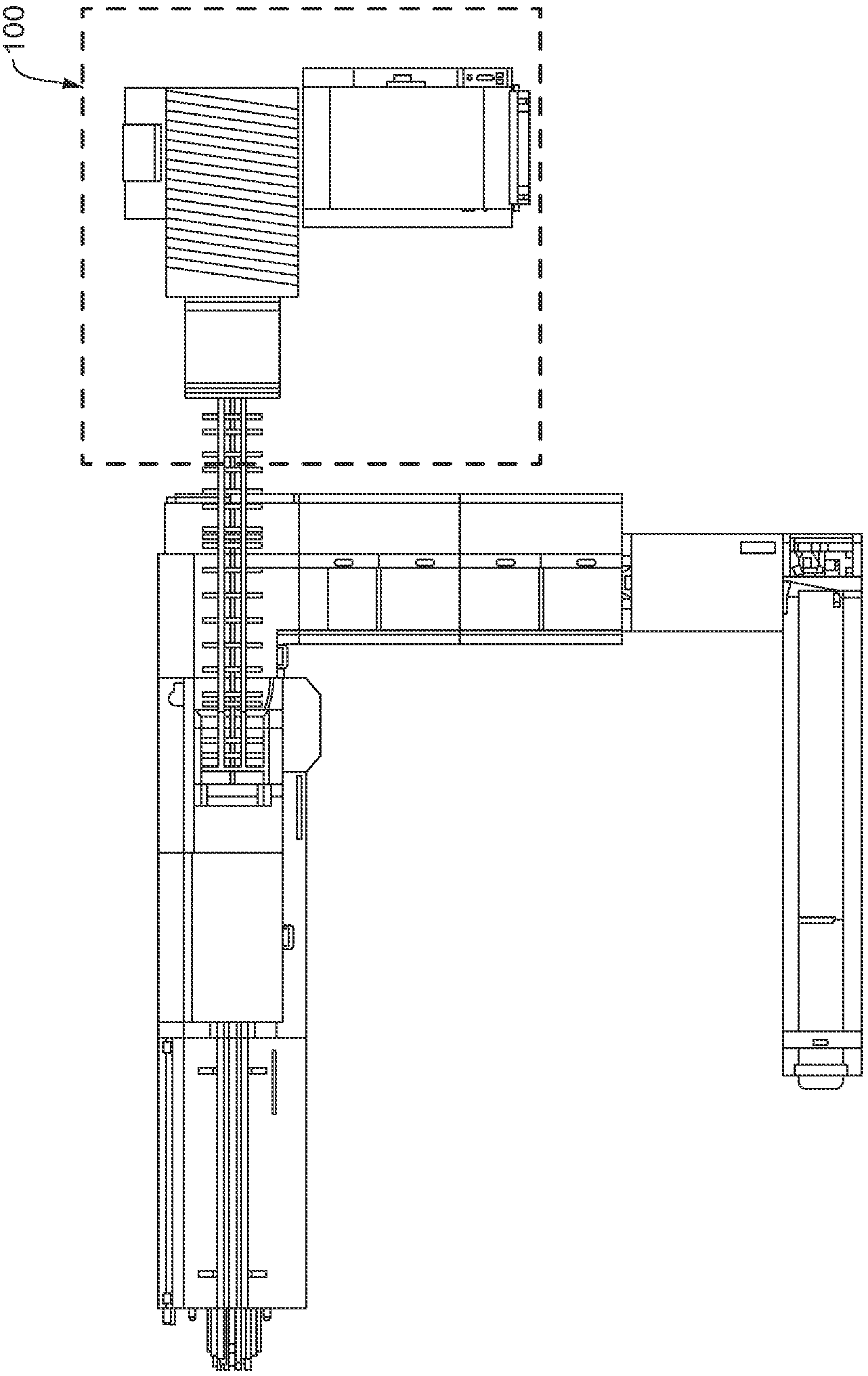
FIGS. 3, 4, and 5 are plan, perspective, and side views, respectively, of the hybrid inserter/wrapper system of the present invention.
Figure 4:
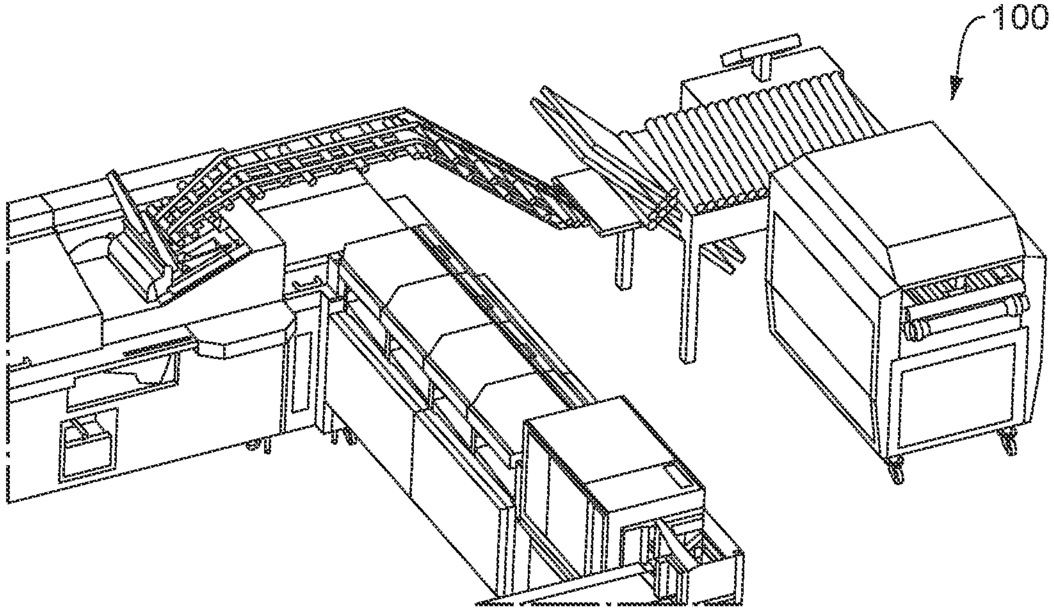
Figure 5:
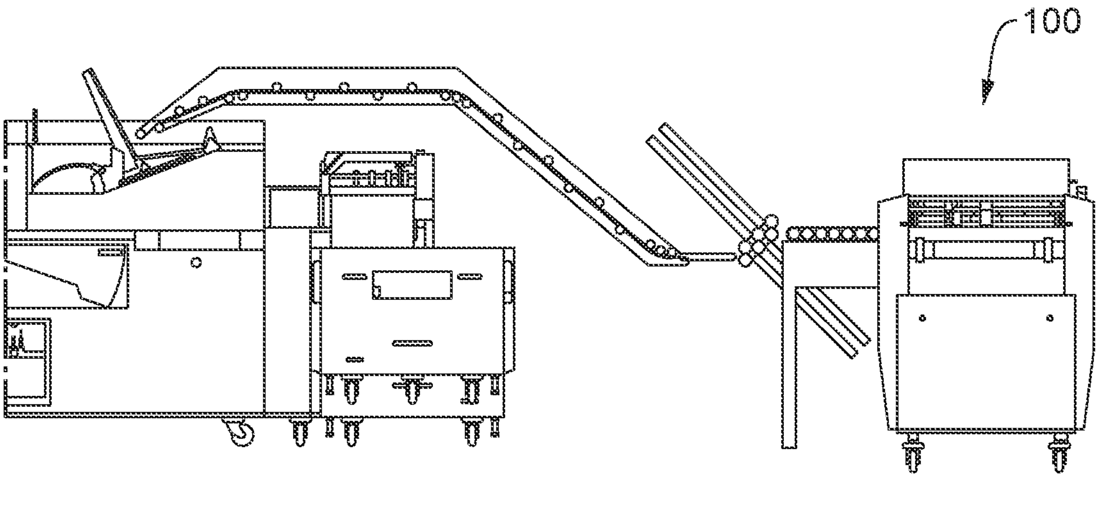

FIGS. 3, 4, and 5 are plan, perspective, and side views, respectively, of the hybrid inserter/wrapper system of the present invention. In particular, as shown in FIGS. 3-5, the wrapper-like envelope creation module 100 operably connected to the document inserter system 10 by way of a pre-feeder assembly (illustrated as a transport deck including a ramp feed) that is coupled to an envelope insertion station 22 of the inserter system and configured to provide fabricated envelopes thereto.

Figure 6:
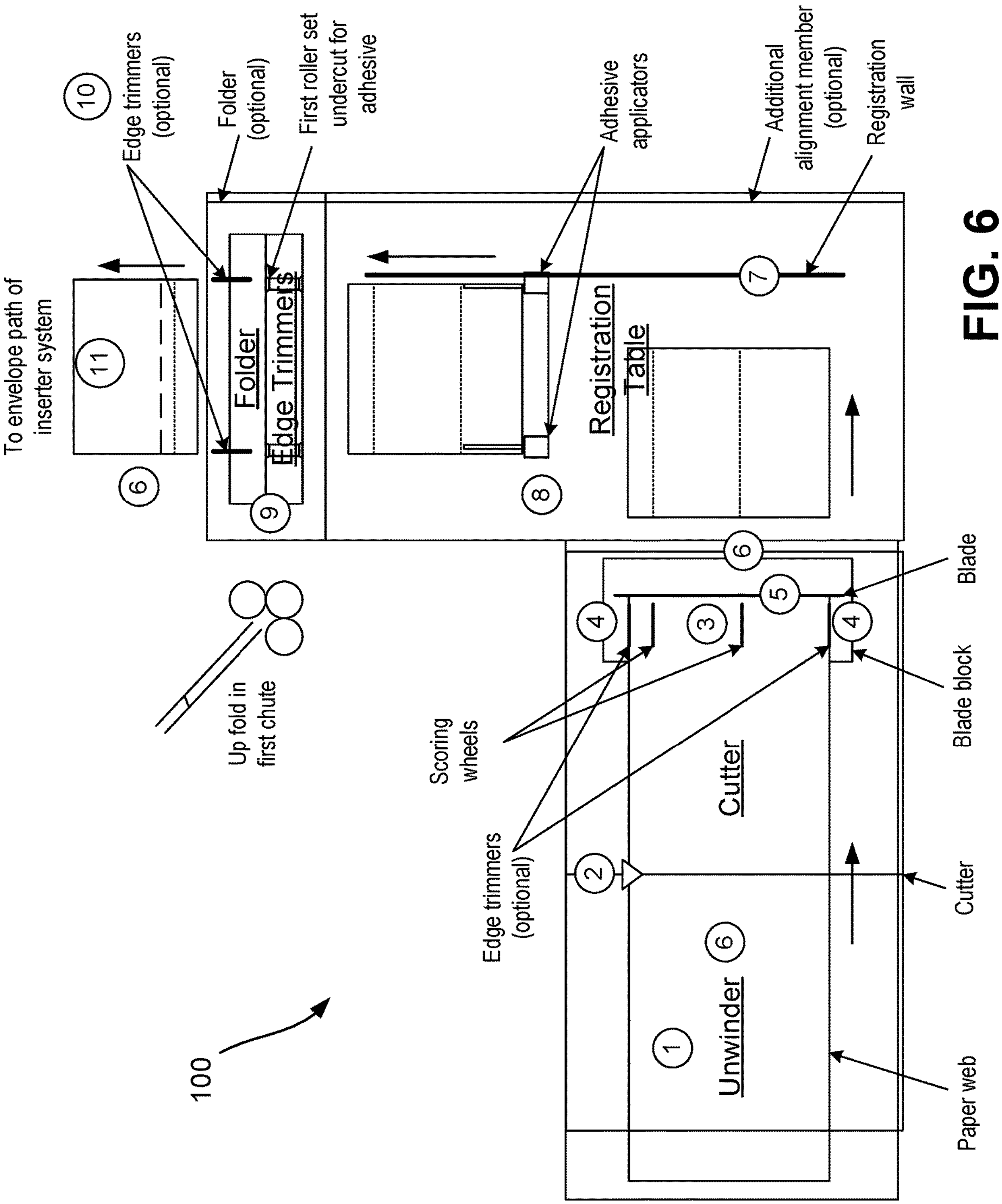
FIG. 6 is a schematic plan view of one embodiment of the wrapper-like envelope creation module of the present invention.

FIG. 6 is a schematic plan view of one embodiment of the wrapper-like envelope creation module 100 of the present invention showing components of the wrapper-like envelope creation module 100 in greater detail.

As previously described herein, the wrapper-like envelope creation module 100 is configured to allow the inserter to provide dual functions with respect to envelope creation and/or envelope feeding. In particular, the wrapper-like envelope creation module 100 is configured to allow the inserter to operate in a first mode, in which the wrapper-like envelope creation module is configured to fabricate wrapper-like outer envelopes and feed such outer envelopes to the inserter system. When operating in a second mode, the inserter feeder module is configured to be loaded with premade envelopes and feed such envelopes to the inserter system. In either mode, the document inserter system further carries out downstream operations to thereby produce a finished mailpiece.

As shown, the wrapper-like envelope creation module 100 may generally include a loading member configured to retain and feed a substrate to a cutting assembly. The substrate may generally include a paper or paper-like product to be subsequently formed into a wrapper-like outer envelope. The paper may either be in the form of individual sheets of paper or, in some embodiments, the loading member may be configured to hold a web of paper. Accordingly, in a first configuration, in which a web of substrate is being used for fabricating the envelopes, the loading member may include an unwinder for retaining, supporting, and subsequently feeding the web of substrate to the cutting assembly. In a second configuration, in which sheets of substrate are being used, as opposed to a web, the loading member may include a sheet feeder (in lieu of an unwinder). Furthermore, by utilizing sheets of substrate (instead of a web), other components of the wrapper-like envelope creation module 100 may be eliminated, such as certain trimmers and cutting members provided in the cutting assembly, as will be described in greater detail herein.

It should be noted that, in some embodiments, when feeding the web to the cutting assembly, the web may be notched to create a V-cut for a flap-like look (see reference character 2). Furthermore, in some embodiments, simplex or duplex printing may be included (see reference character 6) at the loading stage, cutting stage, and/or post-folding stage of the wrapper-like envelope creation module 100.

The cutting assembly may include various cutting members, including, but not limited to, cutting rollers and/or blocks, trimmers (i.e., edge trimmers or the like), and scoring wheels, for cutting the web of paper and/or individual sheets to size and further prescoring portions of a given portion of substrate for subsequent formation of the outer envelope. For example, upon the substrate material being fed to the cutting assembly, the substrate may be scored (see reference character 3) to thereby prefold the lines for a bottom of a crease and a flap crease of the envelope. Additionally, edge trimmers may be used (see reference character 4) to trim the substrate to improve the overall look of the envelope. A cutter member may be used to cut the substrate to a desired length (see reference character 5). It should be noted that the particular configuration of cutting and/or folding members may be based on a given client's desired production needs and thus such configurations can be customized based on the final desired envelope product.

The wrapper-like envelope creation module 100 may further include a registration table, in which cut and scored pieces of substrate are subsequently aligned with (see reference character 7) and fed through one or more adhesive applicators configured to apply adhesive in a predefined two-dimensional pattern on the piece of substrate (see reference character 8). For example, the adhesive applicators may generally be configured to apply adhesive to side seams of the piece of substrate (e.g., associated with the folding patterns created on the piece of substrate). The piece of substrate is then fed into a folder member configured to fold prescored portions of the substrate upon the predefined pattern of adhesive previously applied to the substrate to thereby create a bond between layers of the substrate (see reference character 9) and produce an outer envelope. It should be noted that, in some embodiments, edge trimmers may be used to trim edges of the envelope to an exact desired size (see reference character 10), thereby providing an improved look and consistency of a given run. The outer envelope then passes along a pre-feeder assembly and is subsequently transferred to an envelope insertion station 22 of the modular document inserter system 10, at which point the inserter system 10 carries out downstream operations to thereby produce a finished mailpiece (i.e., content material is inserted into the produced outer envelope and subsequently sealed).

A further embodiment may use a starch type glue applicator with a dryer upstream on the web before the cutter to apply standard envelope type glue.

As previously described, the wrapper-like envelope creation module 100 allows the inserter to be configured to provide dual functions with respect to envelope creation and/or feeding. The unique wrapper-like envelope creation module 100 will allow a customer to go from wrapper-like outer envelope fabrication, in which the outer envelope is produced in the workcell, to a traditional outer envelope using an envelope that was supplied from another workcell or purchased from a third party. In particular, the wrapper-like envelope creation module is able to handle a cutsheet or roll-fed web for fabrication of the outer envelope, or can be reconfigured to allow the inserter to accept a traditional envelope (flap pre-glued and flap pre-folded).

Accordingly, hybrid inserter/wrapper system of the present invention provides numerous advantages over conventional mailpiece fabrication and inserter systems. By providing dual functionality with respect to envelope creation and/or feeding, the unique wrapper-like envelope creation module will allow a customer to go from wrapper-like outer envelope fabrication, in which the outer envelope is produced in the workcell, to a traditional outer envelope using an envelope that was supplied from another workcell or purchased from a third party. The hybrid inserter/wrapper system combines the integrity and efficiency of high speed inserting with an alternative envelope creation processing, thereby helping mail operations streamline the production of high quality customer communications and helping mailers achieve significant cost savings and operational improvements, with little to no application or workflow changes.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

The invention claimed is:

1. A wrapper-like envelope creation module configured to be operably coupled to a modular document inserter system, the wrapper-like envelope creation module configured to operate in a first mode and a second mode, wherein:

when in the first mode, the wrapper-like envelope creation module is configured to fabricate wrapper-like outer envelopes and feed said outer envelopes to the document inserter system; and when in the second mode, the wrapper-like envelope creation module is configured to allow the document inserter system be loaded with premade envelopes to be further processed by the document inserter system.

2. The wrapper-like envelope creation module of claim 1, further comprising a loading member configured to retain and feed a substrate to a cutting assembly.

3. The wrapper-like envelope creation module of claim 2, wherein the loading member comprises an unwinder member for supporting and feeding a web of substrate to the cutting assembly.

4. The wrapper-like envelope creation module of claim 2, wherein the loading member comprises a sheet feeder for supporting and feeding one or more sheets of substrate to the cutting assembly.

5. The wrapper-like envelope creation module of claim 2, wherein the cutting assembly comprises one or more cutting rollers, trimmers, and/or scoring wheels for cutting, trimming, and/or scoring the substrate for subsequent formation of envelopes.

6. The wrapper-like envelope creation module of claim 5, further comprising a registration table for receiving and aligning one or more pieces of cut and scored, substrate with one or more adhesive applicators configured to apply adhesive in a predefined two-dimensional pattern on the one or more pieces of substrate.

7. The wrapper-like envelope creation module of claim 6, wherein the adhesive applicators are configured to apply adhesive to one or more side seams of a given piece of substrate that are associated with one or more folding patterns created on the given piece of substrate.

8. The wrapper-like envelope creation module of claim 7, further comprising a folder member configured to fold prescored portions of the given piece of substrate upon the predefined pattern of adhesive previously applied to the given piece of substrate to thereby create a bond between layers of the substrate and produce an envelope.

9. The wrapper-like envelope creation module of claim 1, further comprising a pre-feeder assembly for receiving envelopes and feeding said envelopes to an envelope inserter station of a modular document inserter system.

10. The wrapper-like envelope creation module of claim 9, wherein the pre-feeder assembly is configured to receive wrapper-like outer envelopes fabricated by the feeder module when operating in the first mode and allow the inserter to accept premade envelopes when operating in the second mode.

11. A method for fabricating a mailpiece, the method comprising:

providing a wrapper-like envelope creation module operably coupled to a modular document inserter system;

operating the wrapper-like envelope creation module in a first mode, in which the wrapper-like envelope creation module fabricates wrapper-like outer envelopes and feeds said outer envelopes to the document inserter system; and operating the wrapper-like envelope creation module ins a second mode, in which the wrapper-like envelope creation module allows the document inserter system to be loaded with premade envelopes to be further processed by the document inserter system.

12. The method of claim 11, further comprising providing a loading member configured to retain and feed a substrate to a cutting assembly.

13. The method of claim 12, wherein the loading member comprises an unwinder member for supporting and feeding a web of substrate to the cutting assembly.

14. The method of claim 12, wherein the loading member comprises a sheet feeder for supporting and feeding one or more sheets of substrate to the cutting assembly.

15. The method of claim 12, wherein the cutting assembly comprises one or more cutting rollers, trimmers, and/or scoring wheels for cutting, trimming, and/or scoring the substrate for subsequent formation of envelopes.

16. The method of claim 15, further comprising providing a registration table for receiving and aligning one or more pieces of cut and scored, substrate with one or more adhesive applicators configured to apply adhesive in a predefined two-dimensional pattern on the one or more pieces of substrate.

17. The method of claim 16, wherein the adhesive applicators are configured to apply adhesive to one or more side seams of a given piece of substrate that are associated with one or more folding patterns created on the given piece of substrate.

18. The method of claim 17, further comprising providing a folder member configured to fold prescored portions of the given piece of substrate upon the predefined pattern of adhesive previously applied to the given piece of substrate to thereby create a bond between layers of the substrate and produce an envelope.

19. The method of claim 11, further comprising providing a pre-feeder assembly for receiving envelopes and feeding said envelopes to an envelope inserter station of a modular document inserter system.

20. The method of claim 19, wherein the pre-feeder assembly is configured to receive wrapper-like outer envelopes fabricated by the feeder module when operating in the first mode and allow the inserter to accept premade envelopes when operating in the second mode.

* * * * *